(12) United States Patent
Mendonsa et al.

(10) Patent No.: US 12,417,787 B1
(45) Date of Patent: Sep. 16, 2025

(54) HARD DISK DRIVE WITH DYNAMICALLY DESIGNATED MEDIA ZONES FOR ARCHIVING AND PERFORMANCE

(71) Applicant: SEAGATE TECHNOLOGY LLC, Fremont, CA (US)

(72) Inventors: Riyan Alex Mendonsa, Edina, MN (US); Jon D. Trantham, Chanhassen, MN (US)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 18/780,794

(22) Filed: Jul. 23, 2024

Related U.S. Application Data

(63) Continuation-in-part of application No. 18/672,636, filed on May 23, 2024.

(51) Int. Cl.
*G11B 20/12* (2006.01)

(52) U.S. Cl.
CPC .. *G11B 20/1217* (2013.01); *G11B 2020/1242* (2013.01)

(58) Field of Classification Search
CPC ....... G11B 5/6011; G11B 5/012; G11B 5/588; G11B 5/00813; G11B 20/12; G11B 5/5922; G11B 15/1841; G11B 20/183; G11B 5/00
USPC .......................................................... 360/48
See application file for complete search history.

(56) References Cited

U.S. PATENT DOCUMENTS 10,510,374 B2 * 12/2019 Kulkarni ............... G06F 3/0611

* cited by examiner

*Primary Examiner* — Nabil Z Hindi
(74) *Attorney, Agent, or Firm* — Mueting Raasch Group

(57) ABSTRACT

Described are data storage systems and methods in which data ingested by a hard disk drive (HDD) may be first stored in a designated intake zone of the HDD magnetic media using conventional performance parameters and recording techniques, and thereafter compacted and moved to a designated high-density zone on the magnetic media. The compacted data is stored at higher data storage densities than what is convention, and at lower performance parameters, and thus the moving of compacted data to the high-density zone may be done opportunistically in the background. The intake zone and high-density zone may be statically designated or dynamically defined based on HDD performance requirements, usage characteristics, available media capacity, and so forth.

18 Claims, 3 Drawing Sheets

HARD DISK DRIVE WITH DYNAMICALLY DESIGNATED MEDIA ZONES FOR ARCHIVING AND PERFORMANCE

RELATED APPLICATION

This application is a Continuation-In-Part of U.S. patent application Ser. No. 18/672,636, filed on May 23, 2024, entitled "High Density Archival Storage Using Conventional Hard Disk Drive Architecture," the entire contents of which are hereby incorporated by reference.

TECHNICAL FIELD

The disclosure relates to devices and methods for hard drive data storage onto different media zones designated for different storage densities.

SUMMARY

In accordance with various aspects, the present disclosure provides methods for use in hard disk drives that store data on a magnetic media disk. Such methods include designating an intake zone and a high-density zone on the magnetic disk, the intake zone for storing data using conventional techniques and the high-density zone for storing data at a higher density than the intake zone. Incoming data, such as from a host, is stored directly to the intake zone, and then later transferred and compacted to the high-density zone. The relative sizes of the intake zone and the high-density zone may be adjusted based on one or more of a usage metric, a performance metric, and an available capacity metric. In certain aspects, the data transferred from the intake zone to the high-density zone may be erased after verifying valid compacting and storing of the data in the high-density zone. Optionally, error correction information may be computed and stored for the compacted data prior to erasing the data from the intake zone.

In certain aspects, compacting and storing data from the intake zone to the high-density zone occurs opportunistically or during periods where no incoming data is being ingested by the hard disk drive. In certain aspects, compacting and storing data from the intake zone to the high-density zone is allowed to occur while incoming data is being ingested by the hard disk drive.

In certain aspects, compacting and storing data from the intake zone to the high-density zone occurs when the intake zone has reached a threshold level of data fullness. In certain aspects, storing incoming data ingested by the hard disk drive directly to the intake zone is paused when the intake zone is full. In certain aspects, when the intake zone is full, incoming data ingested by the hard disk drive is retained in a buffer until capacity is available in the intake zone, or is stored directly to the high-density zone.

In certain aspects, data is compacted and stored to the high-density zone using multi-rev storage techniques.

In certain aspects, the size of the high-density zone may be increased when the high-density zone is full.

In certain aspects, at least one of the usage metric, performance metric, or available capacity metric is provided to the hard disk drive by a host device, or by the hard disk drive controller or firmware.

In certain aspects, the data is stored in the intake zone using CMR and SMR storage techniques.

In certain aspects, the intake zone is located at or near an outer diameter portion of the magnetic media disk and the high-density zone is located at or near an inner diameter portion of the magnetic media disk, or alternatively, the high-density zone is located at or near an outer diameter portion of the magnetic media disk and the intake zone is located at or near an inner diameter portion of the magnetic media disk.

In certain aspects, methods may further include redesignating some or all of the intake zone for high-density storage when the high-density storage zone is full. Optionally, unused capacity of the some or all of the intake zone redesignated for high-density storage may be reclaimed for data intake.

In accordance with various aspects, the present disclosure provides hard disk drive devices for storing data received from a host device. Such devices include an interface configured to receive data and commands from the host device, a recording head configured to write the received data on a magnetic media disk, and a controller for controlling the writing and reading of data to and from the magnetic media. The controller is configured to perform the following functions: designate an intake zone on the magnetic media disk for storing data using conventional storage techniques; designate a high-density zone on the magnetic media disk for storing data at higher densities than in the intake zone; control writing of data received at the interface directly into the intake zone; control transferring, compacting and storing data from the intake zone into the high-density zone; and adjust relative sizes of the intake zone and the high-density zone based on metrics such as hard disk drive usage, hard disk drive performance, or available capacity in the intake zone or the high-density zone.

The details of one or more aspects of the disclosure are set forth in the accompanying drawings and the description below. Other features, objects, and advantages of the techniques described in this disclosure will be apparent from the description and drawings, and from the claims.

DETAILED DESCRIPTION

Figure 1:
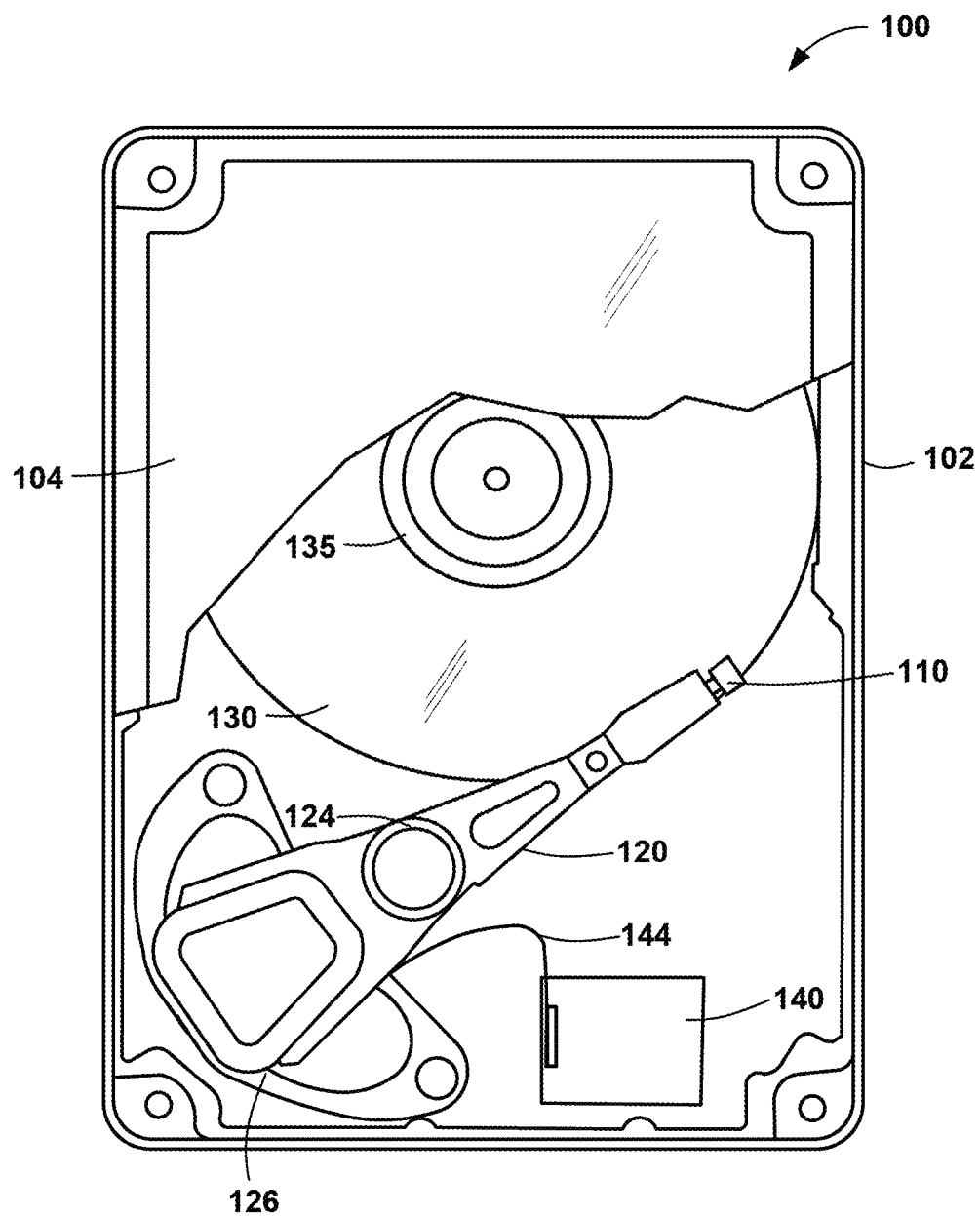
FIG. 1 is a schematic representation of an example hard disk drive as may be used in accordance with the present disclosure.

The present disclosure relates to data storage systems and methods in which data ingested by a hard disk drive (HDD) may be first stored in a designated intake zone on the magnetic media using conventional performance parameters and recording techniques, and then the data stored in the intake zone may be moved to a designated archival (or high-density) zone on the magnetic media at higher data storage densities and lower performance parameters. Such methods may be governed by the HDD controller or firmware, and the intake and high-density zones may be statically designated or dynamically defined based on HDD performance requirements, usage characteristics, available media capacity, and so forth.

Storing data in the high-density media zones may utilize multi-revolution storage techniques such as those disclosed in U.S. patent application Ser. No. 18/672,636, filed on May 23, 2024, entitled "High Density Archival Storage Using Conventional Hard Disk Drive Architecture," which is herein incorporated in its entirety. Such techniques allow storage onto magnetic media at densities far surpassing those available in conventional HDDs without requiring the use of different HDD components or HDD architecture. As used herein, the term "conventional HDD" means a hard drive device that conforms to standard specifications for general use, and that is mass manufactured and readily commercially available. Examples of conventional HDDs include drives that typically rewrite data in a single disk rotation, often referred to as "conventional magnetic recording" or CMR HDDs, and those that typically rewrite bands of data sequentially with each write to the band typically occurring in a single disk rotation, often referred to as "shingled magnetic recording" or SMR HDDs, as well as combinations and variations thereof.

Multiple revolution (also referred to as multi-rev or multi-pass) HDDs use multiple revolutions of the media disks in the process of storing and retrieving data. This differs from conventional "single pass" disk drives, which typically store data sectors in a single revolution and retrieve data sectors in a single revolution. In multi-pass HDDs, the data can be written at a higher density than what is achievable with a single pass drive having the same components and architecture. Multi-rev storage may provide certain benefits such as allowing for the servo-mechanical system to be more "settled" prior to writing. During data retrieval, using multiple revolutions allows for reducing and/or cancelling noise via techniques of averaging the read-back signals from the multiple revs and cancelling the spurious signals from adjacent tracks. Noise sources include adjacent track interference, electronic noise, reader noise, and media noise, as well as track misregistration and/or track following capability.

Utilizing multiple revolutions allows for additional read-after-write processes to ensure the data written at higher areal densities are legible. More sophisticated error correction techniques are possible with multi-rev designs, such as two-dimensional ECC outer codes. However, the capacity advantages of multi-pass drives come with a performance cost that may be burdensome or unacceptable for customers. For example, command completion time can be lengthened, especially in the presence of rotational vibration, which can become problematic for archiving or snapshotting data within allocated time periods. With SMR multi-pass systems, this can manifest itself with the loss of multiple revs and can lead to a cascade effect that may destroy the whole band. The solutions described herein help to keep host performance at an acceptable level in a multi-pass HDD.

In accordance with various aspects, the present disclosure provides a multi-zone hard drive system for multi-pass HDDs in which ingested data is initially written to an intake zone of the magnetic media at the performance and speed of a conventional HDD with standard data formatting (for example, standard SMR or CMR), or even at a relaxed track spacing. Once the ingested data is safely stored in the intake zone, it may then be compacted and stored in a separate high-density zone of the magnetic media, for example opportunistically in the background as controlled by the HDD firmware. In the present disclosure, the terms "regions" and "zones" are used synonymously and descriptively to refer to separate areas on the magnetic media that are designated for conventional data storage and for high-density data storage. In practice, such regions or zones may have a one-to-one correlation to the formal zone definitions provided in SAS/SATA/NVMe SMR standards. Alternatively, such regions or zones may span partial or multiple of these standards-defined zones, may be defined independently from these standards-defined zones, and/or may vary over time, usage of the drive, and/or availability of storage space on the media.

In accordance with various aspects, the conventional intake zones and high-density archival zones may be designated based on radial distance from the center of the magnetic media disk, the inner regions often denoted ID for "inner diameter" and the outer regions often denoted OD for "outer diameter" (with regions in between ID and OD, if any, designated MD for "middle diameter"). Any or all of these regions may be designated for conventional intake or for high-density archival mode storage, depending on use case, application, performance requirements, and so forth. Moreover, such designations can change during the life of the HDD, such as when the drive is new and data is initially stored, when the drive is reformatted or updated with new firmware, as more data is stored and less media capacity becomes available, in order to balance the mechanical wear on the media, and so forth.

Various factors may determine whether to use OD regions or ID regions for high-density recording or for conventional intake. Since OD regions of the media disk normally have higher (often double) the throughput as ID regions, designating OD regions as the intake zone may provide higher performance during data ingest, whereas designating OD regions as the high-density zone may provide higher performance during background operations when archiving data from the intake zone to the high-density zone. Moreover, it is possible to have the drive function like a conventional drive during an initial ingest of data, and then once the drive reaches a desired level of stored data under standard CMR and/or SMR conditions, designating a high-density zone and beginning a data densification process of storing high-density data in that zone. Data densification can occur in the background or during a downtime after the initial data ingest. This may be particularly useful for archival use cases. Such a process may be initiated by a host or by the drive and can make use of time and densification estimates computed based on algorithms by a host or the drive. After data densification, the freed-up capacity may be divided or subdivided into conventional intake and high-density zones for ongoing data ingest and archiving.

Reference will now be made to the drawings, which depict one or more aspects described in this disclosure. However, it will be understood that other aspects not depicted in the drawings fall within the scope of this disclosure. Like numbers used in the figures refer to like components, steps, and the like. However, it will be understood that the use of a reference character to refer to an element in a given figure is not intended to limit the element in another figure labeled with the same reference character. In addition, the use of different reference characters to refer to elements in different figures is not intended to indicate that the differently referenced elements cannot be the same or similar. It will also be appreciated that the drawings are meant to illustrate certain aspects and arrangements of features in a way that contributes to their understanding and are not meant to be scale drawings that accurately represent size or shape of elements.

FIG. 1 schematically depicts a typical HDD device 100 that includes a recording head 110 having read and write capabilities. Recording head 110 is disposed on the end of an actuator arm 120 that is rotationally movable around a pivot 124 by use of a voice coil motor 126. The recording head 110 is positioned in close proximity to the surface of magnetic media disk 130 such that the recording head can write data to and read data from tracks on the magnetic media 130 as it spins by action of a spindle motor 135. Controller electronics 140 may be coupled to the voice coil motor 126 and recording head 110 via a flex cable 144 that connects to traces on the actuator 120. Preamp electronics (not indicated) are typically disposed close to the recording head 110 for conditioning signals to and from the recording head. Controller electronics 140 may also be coupled to spindle motor 135, and thereby control the spinning of the media disk(s) 130 along with the movement of the actuator 120 and the reading and writing of data via recording head 110. The internal components of HDD 100 are contained within an enclosure 102, including cover 104, which is shown partially cut away to reveal the internal components. A host device can communicate with HDD 100 through a standardized interface (not shown).

HDD 100 can operate on any magnetic recording principle, whether that be conventional magnetic recording (CMR), shingled magnetic recording (SMR), heat-assisted magnetic recording (HAMR), or any other type of recording technique, including combinations thereof. While the actuator 120 is shown to move rotationally, the present disclosure is not limited to how the actuator moves and encompasses linear actuation and multiple rotary actuators. Likewise, recording heads such as recording head 110 can be provided on movable or stationary rails, or in any other suitable manner now known or later contemplated.

Figure 2:
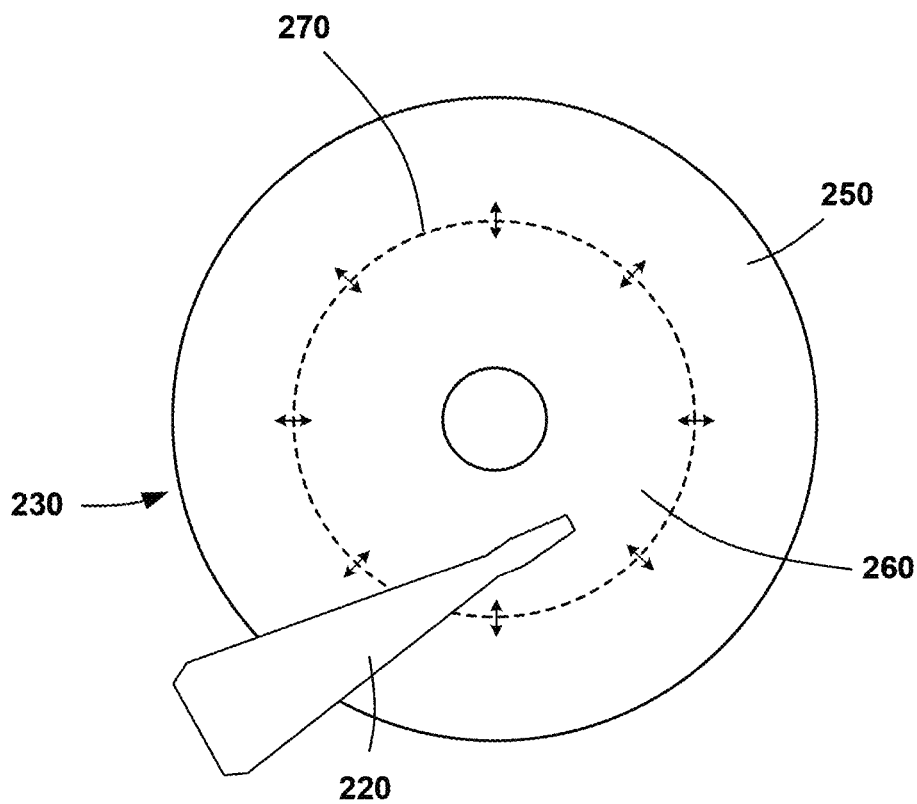
FIG. 2 is a is a schematic representation of a magnetic media disk having dynamically designated zones in accordance with aspects of the present disclosure.

FIG. 2 schematically shows a magnetic media disk 230, along with an actuator arm 220 for reference. The magnetic media disk 230 includes an outer zone 250 and an inner zone 260, which are demarcated at the dashed border 270. Dashed border 270 is not a physical element on the media disk 230, but rather is designated in firmware or in metadata stored within a hard drive device in which media disk 230 is incorporated. As indicated by the arrows on border 270, the position of the border 270 and thus the relative sizes of the outer zone 250 and inner zone 260 can be dynamically adjusted during use. For example, when inner zone 260 is used to store high-density data and outer zone 270 is used for conventional intake, as more data is stored on media disk 230 the border 270 can expand outward so that the size of the high-density inner zone 250 increases to accommodate more data capacity in the high-density zone.

It should be noted that while outer zone 250 may typically be used for convention intake due to higher throughput for incoming data, it is conceivable to use inner zone 250 for intake. Moreover, while FIG. 2 shows only two zones, it will be appreciated that additional zones may be designated. For example, there may be an outermost zone designated for intake into a media cache. The intake region may occupy an intermediate zone, for example between two compacted zones. Also, there may be more than one conventional storage zone, for example there may be a CMR intake zone and an SMR conventional zone. There may also be multiple high-density zones having different areal density capabilities and performance characteristics.

Without loss of generality, the following discussion refers to data ingest occurring in a single conventional OD zone and data compaction occurring in a single high-density ID zone. As incoming data arrives from a host, it may be ingested, compacted, and written into the high-density data zone under various scenarios. In one scenario, there is no separate conventional zone apart from an optional media cache zone, and thus the entirety or vast majority of the data stored on the drive is compacted. The data may be compacted using multi-pass algorithms on a continuous basis as data is received from the host. As such, the host must accommodate a slower performance compared to a conventional HDD. While this means lower throughput, it also means lower write amplification (in other words, fewer reads and writes to store the data) and higher power efficiency.

In another scenario, two zones are used as shown in FIG. 2, with the size of the OD zone 250 being fixed. Data received from the host is initially stored conventionally in the OD zone 250. When the host storage session is complete or goes idle (that is, there are no further write commands sent from the host to the drive to be executed), the drive can read data from the OD zone 250 and compact the data and store it to the high-density ID zone 260. After the data from the conventional OD zone 250 is stored to the high-density ID zone, the associated sectors of the OD zone 250 can be freed for new incoming data. In certain embodiments, the OD zone 250 is freed for incoming data only after the compacted data stored in the high-density ID zone 250 has been read back and verified, and any additional ECC parity has been computed and stored. If an incoming read request is received during the background operation of compacting the data to the high-density zone, the background operation may be interrupted so that the read request can be serviced by the drive, thereby pausing the ongoing data compaction and transfer.

When incoming data first arrives at the drive, the storage throughput is at a maximum. If the amount of incoming data remains below the ability of the HDD to move it to the compacted region, then the performance remains high. If enough data is written such that the OD zone becomes full, then the incoming data can either be compacted and directly written to the high-density ID zone (thus bypassing the OD zone), or the incoming data can be held and written to the OD zone only after other data has been compacted and transferred from the OD zone to the ID zone. In either case, the command completion time will increase considerably until the drive is able to service all the data from the OD cache.

In yet another scenario, the drive generally works as set forth in the previous scenario with two zones as shown in FIG. 2. In this case, the size of the OD zone 250 is initially fixed, but once the storage region of the high-density ID zone 260 is full (or approaches full), some (or all) of the OD zone can be repurposed as a permanent data store, whether compacted (high-density) or non-compacted (CMR or SMR). The repurposed portions of the OD zone may be returned to being used as intake (that is, as cache) if and when ID zones are freed. Aspects of this scenario are further described below in reference to FIG. 3.

In yet another scenario, the drive is initially configured such that the OD (intake) zone occupies most or all of the storage area of the drive, for example the OD zone makes up 70% of the disk area. The initial storage capacity of the drive is much less than its potential capacity, but the host need not be made aware of this. As the drive is filled, the data may be compacted and stored in the ID zone starting from the OD and in a similar manner as set forth previously. As the ID zone fills, freed space from the OD zone may be reallocated to the ID zone, with data in this region now stored in a compacted fashion. Once the compaction is complete, the remaining space is released and filled as set forth previously, or recursively, until the drive is full, thus increasing the capacity of the drive to its full potential.

Figure 3:
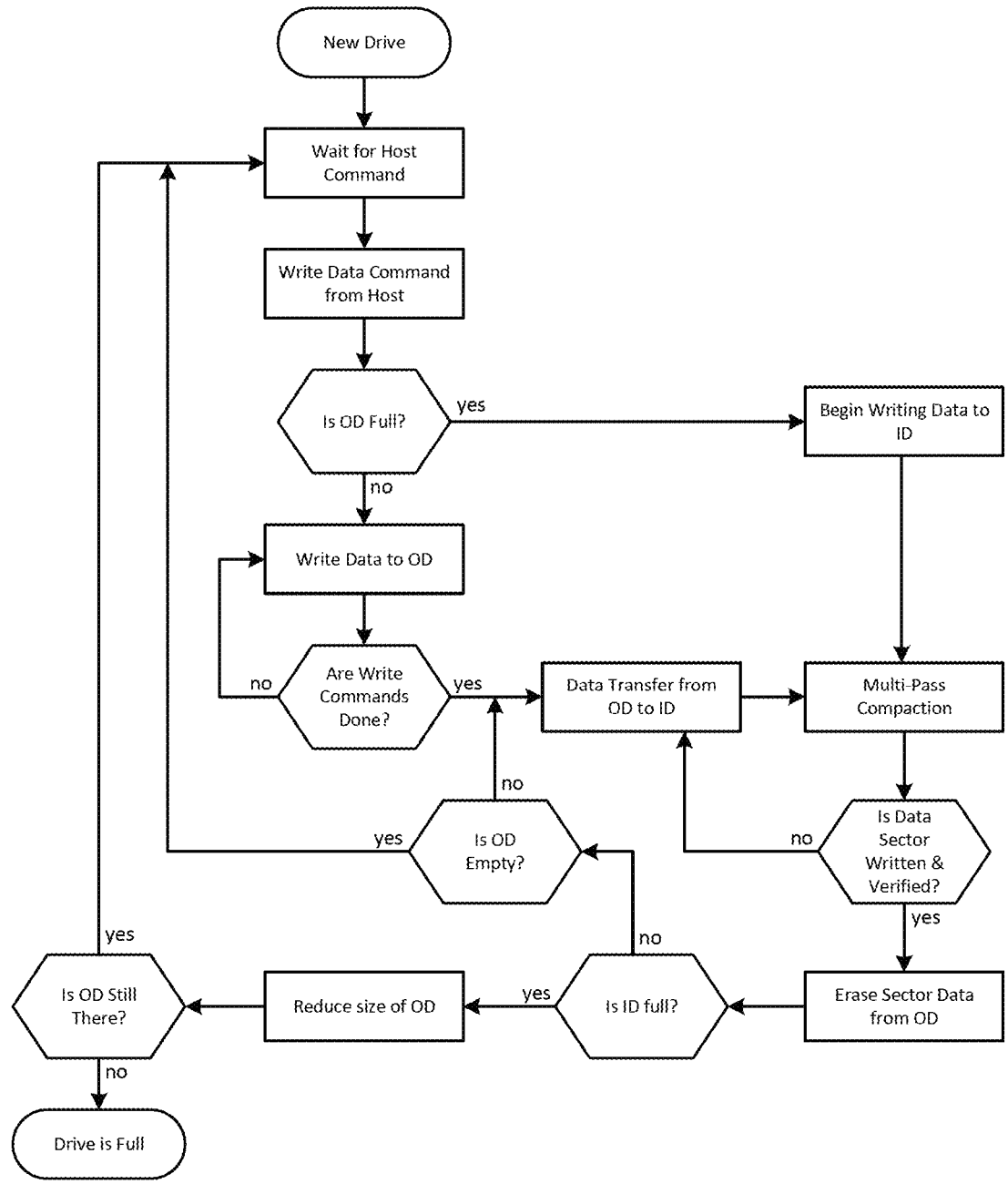
FIG. 3 is a flow chart depicting steps in exemplary methods in accordance with the present disclosure.

FIG. 3 is a flow chart that illustrates and summarizes various aspects of the present disclosure. For example, in a new HDD (or newly formatted HDD), OD and ID zones are designated for the intake and high-density storage of data, respectively. The default state is waiting for a host command. When a command to write data is received from the host, the data will be written to the OD zone unless the OD zone is already full. So long as there is available capacity in the OD zone, new write commands are written directly to the OD zone. Data may be transferred from the OD zone to the ID zone opportunistically, for example in the background while waiting for new host commands. If the OD zone is full while host write commands are being received or processed, the incoming data may be written directly to the ID zone in a multi-rev high-density fashion with decreased performance. When transferring data from the OD zone to the ID zone, or when writing directly to the ID zone, the data may be compacted by multi-pass techniques as discussed herein.

Data continues to be transferred from the OD zone to the ID zone until the data sector(s) from the OD zone is/are written to and verified in the ID zone, at which point the corresponding data sectors may be released/freed from the OD zone. If after this process capacity remains in the ID zone and the OD zone, then the whole process starts over beginning with data intake via host write commands. If capacity remains in the ID zone but the OD zone is full, then additional data may be transferred from the OD zone to the ID zone to create room for additional data intake in the OD zone. When the ID zone is full, then the size of the OD zone may be reduced, thereby claiming additional capacity for the ID zone. At a certain point, the ID zone becomes full, and the OD zone has either vanished or cannot be reduced any further. At this point, the drive is full.

It will be recognized that the above descriptions are exemplary embodiments, and that various aspects described may be used optionally or conditionally in certain implementations or may be modified or replaced in certain implementations. For example, the intake zone(s) may be implemented on the magnetic media disk, in flash media or other non-volatile memory, or in a separate drive as part of a storage array. In certain implementations, a connected host may be made aware of the state of the drive so that, for example, commands may be paused or other commands may be leveraged to help facilitate or accommodate drive operations, especially those related to data compaction, dynamically or statically adjusting zone sizes, and so forth. In other words, the allocation of zone size, along with changes and adjustments thereto, along with the data compaction process may be managed by the host. In certain implementations, interrupts and other queries can be used to help the host understand the current state of the drive and/or where (that is, in which zone) the write-data is being directly written. In certain implementations, dynamic data tables may be used to track and handle the various data movements within the drive and between zones. Such tables may be stored on the magnetic disk or on another non-volatile medium such as flash. It will also be recognized that, since methods of the present disclosure may be implemented using existing or conventional HDD components and architectures, existing drives may be modified through a firmware update to be able to store data according to the various aspects described herein.

It should be understood that various aspects disclosed herein may be combined in different combinations than the combinations specifically presented in the description and accompanying drawings. It should also be understood that, depending on the example, certain acts or events of any of the processes or methods described herein may be performed in a different sequence, may be added, merged, or left out altogether (for example, all described acts or events may not be necessary to carry out the techniques). In addition, while certain aspects of this disclosure are described as being performed by a single module or unit for purposes of clarity, it should be understood that the techniques of this disclosure may be performed by a combination of units or modules.

All scientific and technical terms used herein have meanings commonly used in the art unless otherwise specified. The definitions provided herein are to facilitate understanding of certain terms used frequently herein and are not meant to limit the scope of the present disclosure.

As used herein, the term "configured to" may be used interchangeably with the terms "adapted to" or "structured to" unless the content of this disclosure clearly dictates otherwise.

As used herein, the term "or" refers to an inclusive definition, for example, to mean "and/or" unless its context of usage clearly dictates otherwise. The term "and/or" refers to one or all of the listed elements or a combination of at least two of the listed elements.

As used herein, the phrases "at least one of" and "one or more of" followed by a list of elements refers to one or more of any of the elements listed or any combination of one or more of the elements listed.

As used herein, the terms "coupled" or "connected" refer to at least two elements being attached to each other either directly or indirectly. An indirect coupling may include one or more other elements between the at least two elements being attached. Further, in one or more embodiments, one element "on" another element may be directly or indirectly on and may include intermediate components or layers therebetween. Either term may be modified by "operatively" and "operably," which may be used interchangeably, to describe that the coupling or connection is configured to allow the components to interact to carry out described or otherwise known functionality.

The singular forms "a," "an," and "the" encompass embodiments having plural referents unless its context clearly dictates otherwise.

As used herein, "have," "having," "include," "including," "comprise," "comprising" or the like are used in their open-ended sense, and generally mean "including, but not limited to." It will be understood that "consisting essentially of," "consisting of," and the like are subsumed in "comprising," and the like.

Reference to "one embodiment," "an embodiment," "certain embodiments," or "some embodiments," and so forth, means that a particular feature, configuration, composition, or characteristic described in connection with the embodiment is included in at least one embodiment of the disclosure. Thus, the appearances of such phrases in various places throughout are not necessarily referring to the same embodiment of the disclosure. Furthermore, the particular features, configurations, compositions, or characteristics may be combined in any suitable manner in one or more embodiments.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the disclosure.

What is claimed is:
1. A method for use in a hard disk drive for storing data on a magnetic media disk, the method comprising:
designating an intake zone on the magnetic disk for storing data using conventional storage techniques;

designating a high-density zone on the magnetic disk for storing data at higher densities than the intake zone;

storing incoming data ingested by the hard disk drive directly to the intake zone;

compacting and storing data from the intake zone to the high-density zone; and adjusting relative sizes of the intake zone and the high-density zone based on one or more of a usage metric, a performance metric, and an available capacity metric.

2. The method of claim 1, further comprising erasing data from the intake zone after verifying valid compacting and storing of said data into the high-density zone.

3. The method of claim 2, further comprising computing and storing error correction information for the data compacted and stored in the high-density zone prior to erasing the data from the intake zone.

4. The method of claim 1, wherein compacting and storing data from the intake zone to the high-density zone occurs opportunistically or during periods where no incoming data is being ingested by the hard disk drive.

5. The method of claim 1, wherein compacting and storing data from the intake zone to the high-density zone is allowed to occur while incoming data is being ingested by the hard disk drive.

6. The method of claim 1, wherein compacting and storing data from the intake zone to the high-density zone occurs when the intake zone has reached a threshold level of data fullness.

7. The method of claim 1, wherein the step of storing incoming data ingested by the hard disk drive directly to the intake zone is paused when the intake zone is full.

8. The method of claim 7, wherein when the intake zone is full, incoming data ingested by the hard disk drive is retained in a buffer until capacity is available in the intake zone, or is stored directly to the high-density zone.

9. The method of claim 1, wherein data is compacted and stored to the high-density using multi-rev storage techniques.

10. The method of claim 1, comprising increasing the high-density zone size relative to the intake zone size upon a determination that the high-density zone is full.

11. The method of claim 1, wherein at least one of the usage metric, performance metric, or available capacity metric is provided to the hard disk drive by a host device.

12. The method of claim 1, wherein at least one of the usage metric, performance metric, or available capacity metric is provided by the hard disk drive.

13. The method of claim 1, wherein data is stored in the intake zone using CMR and SMR storage techniques.

14. The method of claim 1, wherein the intake zone is located at or near an outer diameter portion of the magnetic media disk and the high-density zone is located at or near an inner diameter portion of the magnetic media disk.

15. The method of claim 1, wherein the high-density zone is located at or near an outer diameter portion of the magnetic media disk and the intake zone is located at or near an inner diameter portion of the magnetic media disk.

16. The method of claim 1, further comprising redesignating some or all of the intake zone for high-density storage when the high-density storage zone is full.

17. The method of claim 16, further comprising reclaiming unused capacity of the some or all of the intake zone redesignated for high-density storage, and using the reclaimed unused capacity for data intake.

18. A hard disk drive for storing data received from a host device, the hard disk drive comprising:

an interface configured to receive data and commands from the host device;

a recording head configured to write the received data on a magnetic media disk; and a controller configured to designate an intake zone on the magnetic media disk for storing data using conventional storage techniques, designate a high-density zone on the magnetic media disk for storing data at higher densities than in the intake zone, control writing of data received at the interface directly into the intake zone, control transferring, compacting and storing data from the intake zone into the high-density zone, and adjust relative sizes of the intake zone and the high-density zone based on hard disk drive usage, hard disk drive performance, or available capacity in the intake zone or the high-density zone.

* * * * *